United States Patent

[11] 3,542,414

[72] Inventor Ralph R. Nelson
 436 Lingle Ave., Lafayette, Indiana 47901
[21] Appl. No. 718,526
[22] Filed April 3, 1968
[45] Patented Nov. 24, 1970

[54] CAMPER AND TRUCK COMBINATION
 10 Claims, 5 Drawing Figs.
[52] U.S. Cl. .................................................... 296/23,
 280/423
[51] Int. Cl. ................................................... P60p 3/32
[50] Field of Search ........................................ 296/23,
 23MC, 423; 214/515

[56] References Cited
 UNITED STATES PATENTS
D. 194,455 1/1963 McIntosh.
3,380,607 4/1968 Dale .............................. 280/423X
3,390,896 7/1968 Philapy ......................... 280/423
3,392,992 7/1968 Baker ........................... 280/423
3,393,922 7/1968 Adams ......................... 280/423
2,698,668 1/1955 McKay ......................... 180/22D
3,103,368 9/1963 Erickson ...................... 214/515X

*Primary Examiner*—Philip Goodman
*Attorney*—Trask, Jenkins & Hanley

ABSTRACT: A camper for mounting in the bed of a pickup truck is releasably locked to the truck on a horizontal axis at the front of the floor of the truck by a lock which permits upward pivotal movement of the rear of the camper. The lock combines with guide blocks at the rear to prevent lateral swinging of the camper. Wheels on the camper close behind the truck support part of the weight of the camper and normally act in tandem with the drive wheels of the truck, so that the camper and truck combine for operation as a unit with two rear axles. The camper wheels permit substantial enlargement of the camper compared with a fully truck-supported camper; while the permissible vertical movement of the camper prevents the camper wheels from acting to lift the truck rear wheels and thereby ensures adequate ground engagement of the rear drive wheels of the truck under all conditions. By releasing the lock, and installing supplemental supports at the front of the camper, the camper becomes self-supporting for camp use on its wheels and such supports, and the truck can be removed for independent use.

INVENTOR
RALPH R. NELSON
BY
Trask, Jenkins & Harley
ATTORNEYS

INVENTOR
RALPH R. NELSON
BY
ATTORNEYS

CAMPER AND TRUCK COMBINATION

This invention relates to a "camper" adapted to be mounted in the bed of a pickup truck.

A popular form of camper comprises a body adapted to be mounted in the bed of a pickup truck or the like. Such prior camper is a substantially self-contained unit which is wholly supported by the truck, which limits its size, and especially its overall length. While the camper body is mountable and demountable from the truck, its mounting and demounting is a relatively laborious task which requires the entire body to be lifted and supported on separate supports. Such mounting and demounting cannot readily be done at a camp site and the separately-supported camper is not adapted to be used. The present invention provides a camper which is partially supported on its own wheels, which is so interrelated with a truck, conveniently a standard pickup truck, that it will operate as a unit with such truck in the manner of a tandem-axle vehicle and will maintain full traction of the truck drive wheels under all conditions, and which is readily removable from the truck at a camp site for support on its own wheels and a pair of supplemental supports, in a manner which renders the camper fully useful and permits the truck to be removed for independent use. This has a number of benefits. The combined camper and truck form a unit which can be operated as a unitary tandem-axle vehicle, forward and rearward, without lateral articulation such as occurs with a trailer, and is therefore adapted to pull a trailer such as a boat trailer on the roads. At a camp site, the camper is readily removable for independent full use as a camper, which frees the truck for independent use, for example, for use as a work truck or to tow the boat trailer to a fishing site and launch the boat at the site. When travel is to be resumed, the truck is readily remounted on the camper to reform a road-travel unit.

In accordance with the invention, the camper body is made substantially longer than the truck bed and has a forward portion which fits into that truck bed. A single camper axle (or tandem-axles) and wheels support the camper immediately behind the rear of the truck and sufficiently close to the rear truck wheels to operate in tandem with them. The camper wheels may have a wider tread, i.e., be more widely spaced, than the truck wheels, The front of the camper is releaseably latched to the truck on a low transverse axis at the front of the truck bed, desirably in a manner which permits upward pivotal movement of the camper about such axis. The latch combines with side guides at the rear of the truck bed, to prevent lateral swinging movement of the camper with respect to the truck. By such a connection, the camper wheels are positioned for operation in tandem with the rear wheels of the truck. The permissible vertical swinging movement of the camper about the front connection axis prevents the camper wheels, when lifted, from lifting the truck wheels and ensures that the truck wheels are always maintained in driving contact with the ground. The springs at that camper axle are interrelated with the rear truck springs to distribute the load in a manner such that in normal road travel the camper does not articulate vertically with respect to the truck.

The accompanying drawings illustrate the invention. In such drawings.

Figure 1:
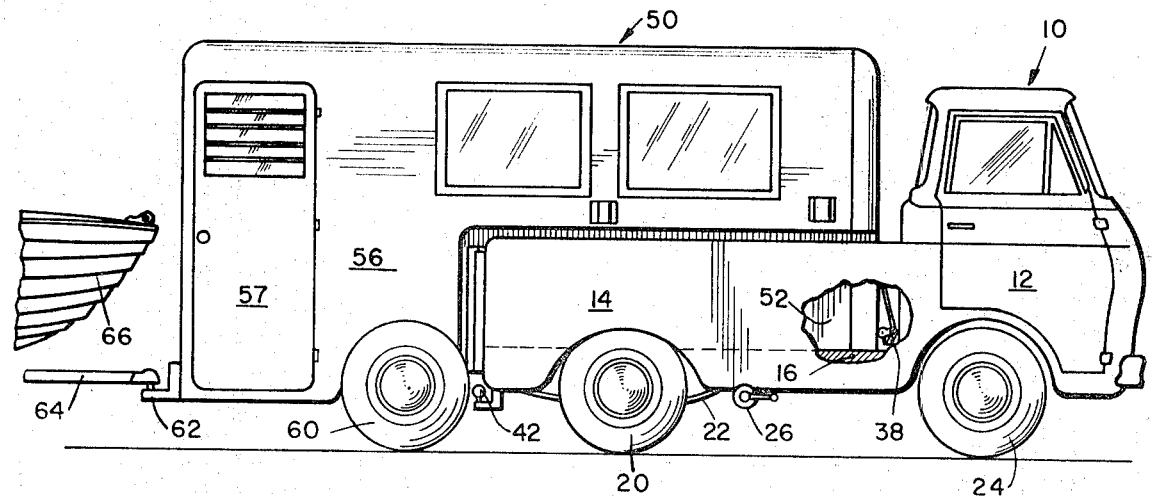
FIG. 1 is a side elevation of a truck and camper combination embodying the invention, arranged for road travel and drawing a boat trailer.
Figure 2:
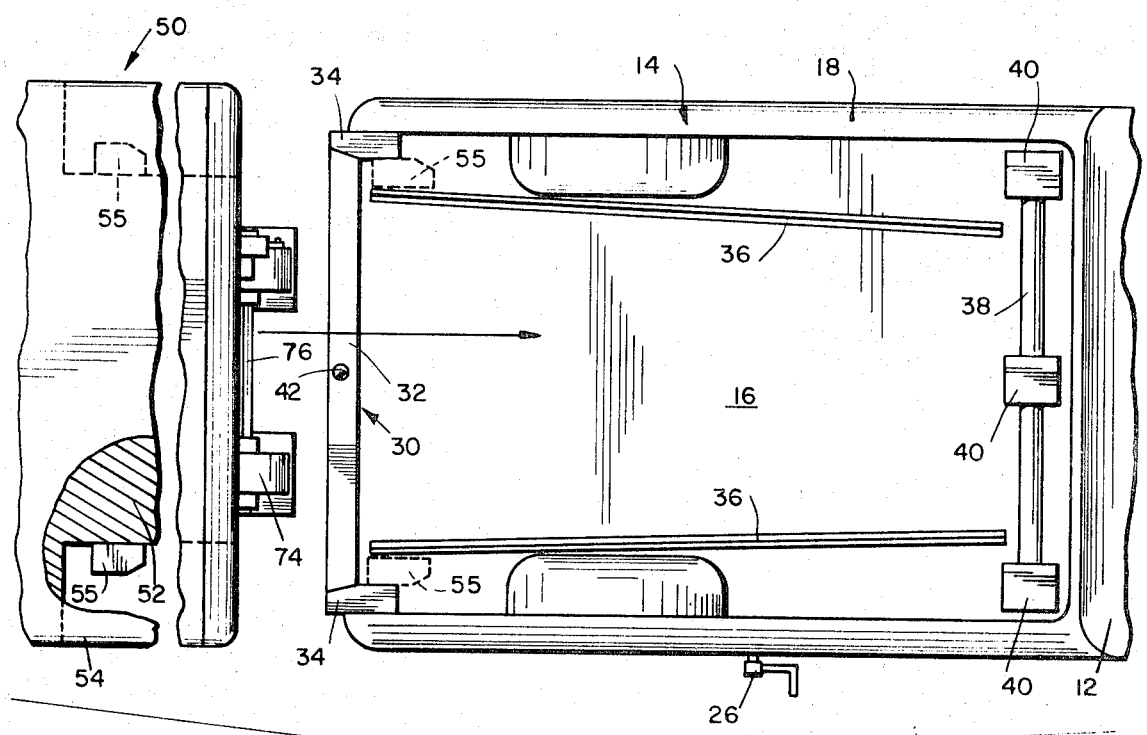
FIG. 2 is a top plan view, with the camper disposed behind the truck in position for mounting.
Figure 3:
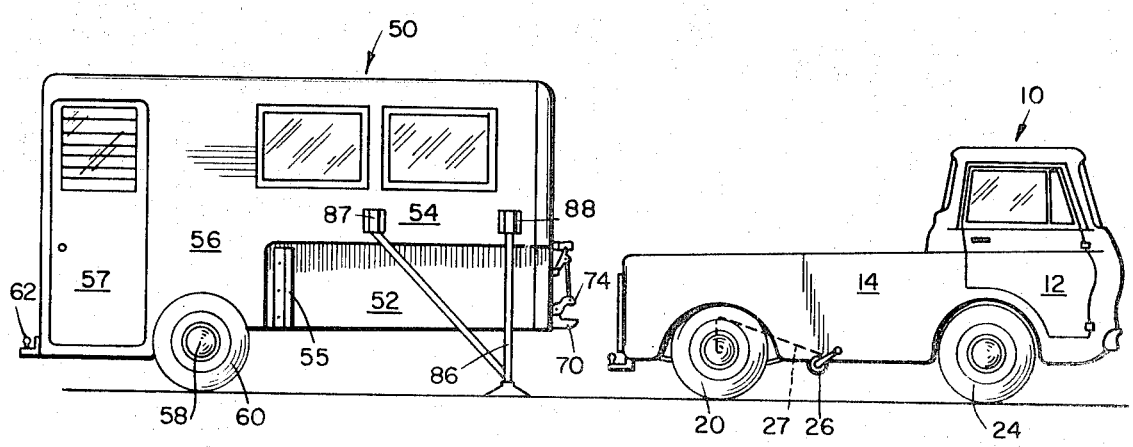
FIG. 3 is a side elevation showing the truck and body in the same relationship as shown in FIG. 2.

The combination unit shown in FIG. 1 comprises a standard pickup truck 10 having a forward cab 12 and a pickup bed or body 14 defined by a floor 16 and sides 18. The truck has rear wheels 20 mounted on leaf springs 22, and front steerable wheels 24 mounted in any conventional manner. To assist in mounting and demounting the camper, the truck is desirably provided with means for compressing the rear springs, here shown as a manually operable winch mechanism 26 adapted to act through a cable 27 to lift the rear axle toward the frame of the truck and thereby lower the bed of the truck as shown in FIG. 3.

At the rear, the body 14 of the truck has its tail gate removed, and is provided with a guide frame 30 having a transverse reinforcing member 32 at the level of the floor 16 and two beveled guide blocks 34 at the sides of the body. The floor 16 is provided with a pair of forwardly converging guide rails 36 for guiding the camper into the truck body, and these lead to a latch bar 38 fixed at its ends and center to the floor 16 and to the truck frame by anchor blocks 40.

The camper 50 comprises a generally rectangular body having a narrow front lower portion 52 adapted to be received within the truck body 14 between the walls 18, an upper front portion 54 of full width to extend over the sidewalls 18 of the truck body, and a rear portion 56 of full width, which may extend to a lower level than the narrow portion 52 and below the floor 16 of the truck. The rear portion 56 of the camper is supported on an axle 58 by suitable springs, and such axle carries a pair of wheels 60 located close behind the rear end of the truck body 14. Such wheels will normally have a somewhat wider tread or distance between the wheels than the tread of the rear wheels 20 of the truck. The overhanging rear portion 56 of the camper may be provided with a door 57 behind the wheels 60.

The rear of the truck carries a trailer hitch 42, and the rear of the camper carries a trailer hitch 62, which as shown in FIG. 1 is connected to the tongue 64 of a boat trailer carrying a boat 66.

Figure 4:
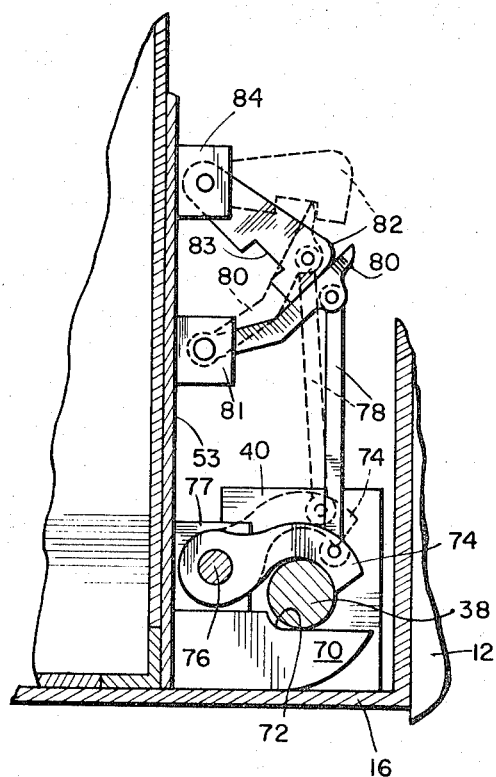
FIG. 4 is a sectional view showing a locking mechanism for locking the camper to the truck.

At the front of the camper 50, the front wall 53 of the narrow portion 52 carries a latch mechanism for engagement with the latch bar 38. The front lower edge of the narrow portion 52 of the camper is rigidly secured to a pair of laterally spaced shoes 70 having curved front ends and adapted to ride on the floor 16 of the truck during the mounting and demounting of the camper. The upper surface of each shoe 70 is formed to slide under the latch bar 38 and to provide a shoulder 72 for engagement against the rear face of such bar 38. A pair of laterally spaced latch hooks 74 are fixed on a cross shaft 76 pivotally mounted in bearings 77 on the front wall 53 of the trailer, for movement together into and out of engagement with the latch bar 38, and are arranged to be raised and lowered by a link 78 leading to a keeper bar 80. The keeper bar 80 is pivoted to a pivot bearing 81 and is arranged to be engaged by a keeper 82 pivoted on a bearing block 84. The lower face of the keeper 82 contains a notch 83 adapted to engage over a projection on the keeper bar 80 to hold it in elevated position and hence to hold the latch hooks 74 in elevated position, as shown in dotted lines in FIG. 4. By releasing the keeper 82 from the projection on the keeper bar 80, the keeper bar may drop to lower the latch hooks into latching engagement with the latch bar 38. The keeper 82 is then swung downward to its full line position in FIG. 4 where it serves to lock the latch hooks 74 in engaged position.

At the rear of the narrow portion 52 of the camper, the sidewalls of such portion carry beveled side blocks 55 adapted to fit between the side blocks 34 at the rear of the truck.

The camper 50 is shown in its normal demounted position in FIG. 3, where it is supported on its own wheels 60 and by a pair of removable supports 86 removably mounted in brackets 87 and 88 on the side of the forward wide portion 54 of the camper body. In this demounted position, the camper is fully and completely useful for its normal camp-housing use. When it is desired to mount it on the truck 10, the truck bed 14 is lowered by operation of the winch 26 to compress the rear springs 22, and the truck is then backed under the forward part of the camper 50. The narrow lower portion 52 enters the truck body 14 between the guide blocks 34, and is guided by such guide blocks 34 and the guide rails 36 toward mounted position. In the course of such movement, the shoes 70 will ride on the floor 16 of the truck bed, until the camper 50 reaches the relative position shown in FIG. 1, at which time the shoes will underlie the latch bar 38. During this movement, the keeper 82 may be engaged over the end of the keeper bar 80 to hold the latch hooks 74 in raised position. When the shoes 70 ride beneath the latch bar 38 to the latching position, the keeper 82 is released to allow the latch hooks to drop down over the bar 38, and the keeper 82 is then moved into locking position behind the keeper bar to lock the latch hooks 74 securely in latched position. The winch 26 is then released, and the supports 86 are removed from the brackets 87 and 88, and the camper 50 then rests flat against the floor 16 of the truck body.

In mounted position the camper 50 is held restrained from lateral swinging movement, both by the spaced latch hooks 74 and by engagement of the side blocks 55 on the camper between the guide blocks 34 at the rear of the truck bed. The springs of the axle 58 on the camper 50 are so related to the rear springs 22 of the truck, that a substantial proportion, say of the order of 50 percent, of the weight of the camper 50 is carried by the rear wheels 20 of the truck. With this relationship, the camper in normal road travel will remain flat against the floor 16 of the truck bed 14, and the truck and camper will operate as a solid unit, and the truck wheels 20 and camper wheels 60 will operate substantially as tandem wheels on a unitary vehicle. The two sets of wheels, being independently sprung, will yield to normal road variations, without displacing the camper from its seated position in the bed of the truck.

Figure 5:
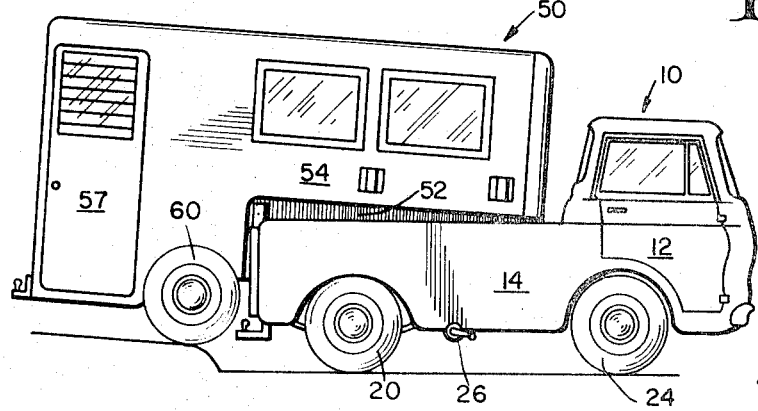
FIG. 5 is a side elevation of the truck and camper unit with the rear end of the camper elevated to show the permissible articulation between the camper and truck.

In the event of an extreme elevation of the camper wheels 60 with respect to the rear truck wheels 20, as for example when the combined unit is backed over a curb, as shown in FIG. 5, the camper 50 is free to swing upward about the latch bar 38, away from its seated position in the bed of the truck. This serves to leave the rear drive wheels 20 of the truck in tractive engagement with the ground, under the weight of the truck itself and of at least a substantial portion of the camper, transmitted through the forward linkage to a point on the truck behind the front wheels 24. Accordingly, under this extreme condition, traction and braking will be maintained at the truck wheels. If a contrary condition exists in which the truck wheels are raised to an extreme level with respect to the camper wheels 60, no corresponding downward articulation of the camper 50 will be necessary, for while a greater proportion of the weight of the camper or even the entire weight of the camper might be transferred to the rear wheels 20 of the truck, and while this is undesirable for normal operation, the truck structure is ample to carry this load and the effect is to increase tractive effort rather than decrease it.

When the camper is mounted on the truck as shown in FIG. 1, the combination forms a unit which may be operated as such and which will be suitable to pull a boat or other trailer behind the combined unit by means of the trailer hitch 62. Upon arrival at a camp site, the camper 50 can be readily dismounted from the truck, by installing the supplement supports 86, lowering the bed of the truck by operation of the winch 26, releasing the latch hooks 74, and driving the truck away from the camper. The truck is then free for independent use, as to pull the boat trailer and to manipulate it for launching and the like. Meanwhile the camper is also fully useful independently of the truck.

The provision on a camper of support wheels which form a tandem relationship with the rear drive wheels of a standard truck, substantially enlarges the permissible size and length of the camper which may be mounted on the truck, and increases the range and convenience of use and operation both of the combined unit and of its elements. It permits a camper to be made substantially equivalent for housing purposes to a trailer, yet avoids the disadvantages which result from the articulated connection of the trailer with a tractive vehicle. It permits the combined truck and camper to be used on the roads as a tow vehicle, for a trailer such as a boat trailer.

Moreover, the arrangement greatly facilitates dismounting of the camper 50 from the truck to release the truck for normal use and for side trips at the camp site. The special articulated relationship of the camper and truck provide for unitary operation while maintaining good tractive effort under all operating conditions.

I claim:

1. A camper or like carrier and means for mounting the same on a truck having a bed and having rear drive wheels and front steerable wheels, comprising:

a carrier body having a forward portion which in mounted position overlies substantially the full length of the bed of the truck and having a rearward portion which extends rearward substantially beyond the rear of the truck;

mounting means including a connection for pivotally connecting the front of the carrier body to the truck on a transverse axis at the front of the truck bed, said body and mounting means being so constructed and arranged that in normal mounted position the body is supported by the truck at points rearward of said connection and thereby supported by the truck against downward pivotal movement about said transverse axis, said mounting providing for pivotal movement by the body about said axis upward from the underlying truck bed, and including means to restrain the body from lateral swinging movement relative to the truck;

carrier wheels which in mounted position of the body are disposed on an axis close behind the rear wheels of the truck for operation in tandem-axle relation with such rear wheels;

supporting spring means between the carrier and said carrier wheels, so constructed and arranged that in mounted position of the body a substantial proportion of the load tending to cause downward pivotal movement of the carrier about said transverse axis is borne by the truck, and in normal road travel the carrier body remains in fixed seated position on the truck bed, supported both by the rear truck wheels and by the carrier wheels;

the carrier in such mounted position being free to pivot upward about said transverse axis and away from the truck, thereby preventing upward movement of the carrier wheels from reducing the tractive load on the rear wheels to less than that imposed by the weight of the truck and that transmitted from the carrier to the truck at said front pivotal connection.

2. A camper or like carrier as set forth in claim 1, in which said mounting means comprises a latch element at the lower front of the body adapted to engage a cooperating latch element at the front of the truck bed.

3. A camper or like carrier as set forth in claim 2 in combination with a truck bed having a cooperating latch element mounted thereon, and guide means on the truck bed to guide said latch elements into engaged relation.

4. A camper or like carrier as set forth in claim 1 in combination with a truck bed, cooperating guide means on the carrier and truck spaced rearward from said pivotal mounting connection and coacting to oppose lateral swinging movement of the carrier with respect to the truck.

5. A camper or like carrier as set forth in claim 1 with the addition of supplemental support means for supporting the front of the body independently of the truck and removable from supporting position said camper wheels and supplemental support being adapted to support the camper for use independently of a truck.

6. A camper or like carrier as set forth in claim 1 in combination with a truck;

with the addition of supplemental support means for supporting the front of the body from the ground and removable from supporting position;

said carrier wheels and supplemental support means being adapted to support the camper for use independently of a truck;

said carrier being mountable on the truck by rearward movement of the truck beneath the front of the carrier; and means on the truck for lowering the bed relative to the wheels to facilitate backing the truck under the carrier.

7. A combination as set forth in claim 6, with the addition of slidable means at the front of the body and cooperating slide-receiving means on the truck for guiding the body to mounted position as the truck is backed under the front of the camper.

8. A camper or like carrier as set forth in claim 1 in which said camper body comprises:
- a front bottom portion of narrow width adapted to be received within the body of a pickup truck;
- a front upper portion of wide width to overlie the sides of the pickup body;
- a rear portion of wide width above and rearward of said carrier wheels; and
- the pivotal connection of said mounting means being positioned at the front of said front bottom portion.

9. A camper or like carrier as set forth in claim 8 in combination with a truck having a pickup body including a bed and an anchor member mounted at the front of said bed for engagement by said pivotal connection, said front bottom and upper portions being supported by said pickup body against downward pivotal movement about said pivotal connection, and interengaging means between the sides of said carrier body and said pickup body at the rear thereof to prevent lateral movement of the carrier body with respect to the rear of the pickup body while permitting upward pivotal movement of the carrier away from its normally seated position in the pickup body.

10. A truck and carrier combination, comprising:
- a truck having rear drive wheels and front steerable wheels supporting a bed;
- a carrier body having a forward portion which in mounted position overlies substantially the full length of the bed of the truck and having a rearward portion which extends rearward substantially beyond the rear of the truck;
- mounting means including a connection for pivotally connecting the front of the carrier body to the truck on a transverse axis at the front of the truck bed, said body and mounting means being so constructed and arranged that in normal mounted position the body is supported by the truck at points rearward of said connection and thereby supported by the truck against downward pivotal movement about said transverse axis, said mounting providing for pivotal movement by the body about said axis upward from the underlying truck bed;
- interengaging means between the rear of the truck bed and the carrier body to restrain lateral swinging movement of the body relative to the bed;
- carrier wheels which in mounted position of the body are disposed on an axis close behind the rear wheels of the truck for operation in tandem-axle relation with such rear wheels;
- supporting spring means between the carrier and said carrier wheels, so constructed and arranged that in mounted position of the body a substantial proportion of the load tending to cause downward pivotal movement of the carrier about said transverse axis is borne by the truck, and in normal road travel the carrier body remains in fixed seated position on the truck bed, supported both by the rear truck wheels and by the carrier wheels; and
- the carrier in such mounted position being free to pivot upward about said transverse axis and away from the truck, thereby preventing upward movement of the carrier wheels from reducing the tractive load on the rear wheels to less than that imposed by the weight of the truck and that transmitted from the carrier to the truck at said front pivotal connection.